March 31, 1936.  H. F. LITTLEDALE  2,036,154
COMBINED LATCH AND LOCK STRUCTURE
Filed May 2, 1935
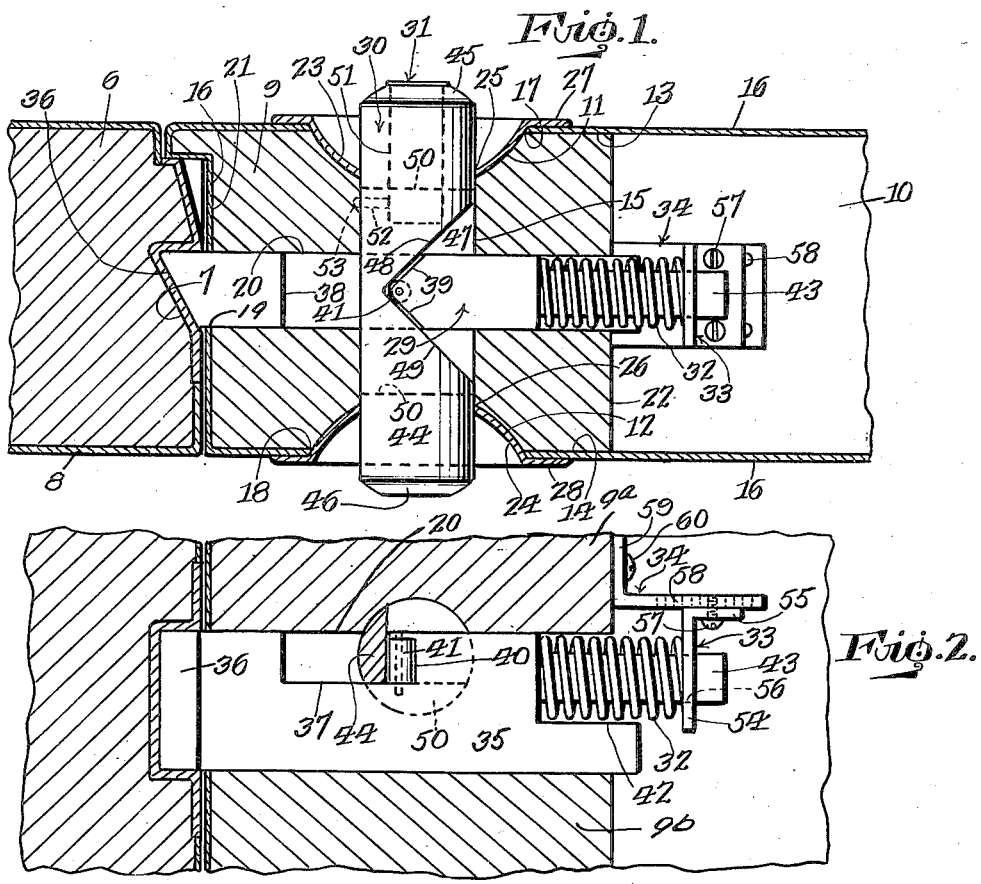
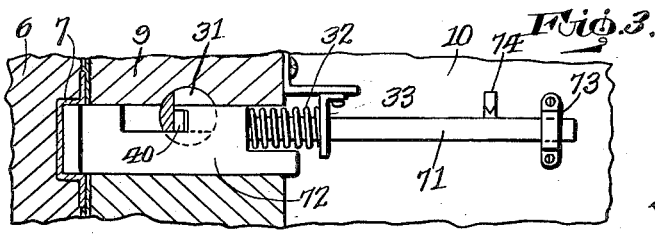
Inventor
*Hickson F. Littledale*
Attorney Patented Mar. 31, 1936

2,036,154

UNITED STATES PATENT OFFICE 2,036,154

COMBINED LATCH AND LOCK STRUCTURE

Hickson F. Littledale, Whittier, Calif.

Application May 2, 1935, Serial No. 19,492

2 Claims. (Cl. 292—170)

This invention relates to a combined latch and lock structure designed primarily for use in connection with doors of automobiles, but it is to be understood that it is adapted for use in any connection in which it may be found applicable.

Further objects of the invention are to provide, in a manner as hereinafter set forth, a combined latch and lock structure which is durable, thoroughly efficient in its use, conveniently operated to released position from the outside and inside of a door, readily installed, permanently tending to latch the door and inexpensive to manufacture.

With the foregoing and other objects in view, the invention consists of such parts and combination of parts as are hereinafter more specifically described and as are illustrated in the accompanying drawing, wherein is shown the preferred embodiment of the invention, but it is to be understood that changes, variations and modifications may be resorted to which fall within the scope of the invention as claimed.

In the drawing:

Figure 1 is a fragmentary view of a door and door frame of an automobile showing the adaptation therewith of the combined latch and lock structure, Figure 2 is a fragmentary view in vertical section of the door and door frame of an automobile showing the adaptation therewith of the combined latch and lock structure, and Figure 3 is a view similar to Figure 2 of a modified form.

The drawing illustrates at 6 one of the sides of a door frame formed with a triangular shaped socket or keeper 7. The side 6 has a metallic facing 8 which conforms in contour to that of the side. A side bar 9 of a door 10 is also shown. The bar 9 is formed of upper and lower superimposed sections 9ª, 9ᵇ which constitute a supporting means for a latching member and releasing plunger to be hereinafter referred to. The bar 9 is provided with a pair of oppositely disposed concavities 11, 12 in its front and inner faces 13, 14 respectively and a circular channel 15 which extends from the base of concavity 11 to the base of concavity 12. The channel opens into and axially of the bases of the concavities. The door 10 is provided with a metallic facing 16 formed with a pair of circular openings 17, 18 having their edges registering with the walls of the concavities 11, 12 respectively. The facing is also formed with a rectangular opening 19. Otherwise than that as stated, the facing 16 conforms in contour to that of the door body. The bar 9 is provided with a rectangular, horizontally disposed passage 20 which opens at the outer and inner side edges 21, 22 respectively thereof and is intersected centrally by the channel 15. The outer end of passage 20 registers with the opening 19. The passage 20 is formed in the upper end of section 9ᵇ of bar 9 and has its top wall provided by the bottom of section 9ª of bar 9. The channel 15 is formed in the sections 9ª, 9ᵇ of bar 9 at the meeting ends of the said sections. Extending into the concavities 11, 12 is a pair of oppositely disposed flanged metallic cup-shaped members 23, 24 respectively having axial openings 25, 26 respectively registering with the ends of channel 15. The flanges of the members 23, 24 are indicated at 27, 28 respectively and overlap and are suitably secured to the outer faces of the front and rear portions respectively of the facing 16.

The combined latch and lock structure includes a latching member 29, a slidable releasing plunger 30 for the member 29, a locking element 31 for plunger 30, a controlling spring 32 for member 29, a combined guide and tensioning means 33 respectively for member 29 and spring 32 and a hanger 34 for the means 33.

The member 29 is of rectangular contour in cross section and consists of a bar 35 having a beveled outer end 36, a transverse groove 37 in its upper face to provide a clearance for a purpose to be referred to. The forward wall 38 of groove 37 is square. The rear wall 39 of groove 37 is inclined rearwardly in opposite outward directions. At the center of wall 39 it is undercut to form a recess 40. Journaled in bar 35 and arranged within and extending from recess 40 is a vertically disposed bearing roller 41. The rear end of bar 36 is rabbeted, as at 42. The member 29 includes a shank 43 of square cross section which is integral with and extends rearwardly from the vertical edge and is spaced above and projects beyond the rear end of the horizontal edge provided by the rabbet 42. The member 29 is slidably mounted in and is of greater length than that of passage 20. The controlling spring 32, to be hereinafter more fully referred to, permanently tends to maintain the beveled end of member 29 in the socket 7 to latch the door and bar 35 against plunger 30 to prevent rattling. The walls of socket 7 are lined with the facing 16.

The releasing plunger 30 is slidably mounted in channel 15 and consists of a transversely disposed body 44 having its end portions of circular cross section. The body 44 is of slightly greater length than the transverse width of the door. The outer and inner ends 45, 46 of body 44 are beveled. The body 44 is cut out to form a vertically disposed triangular shaped notch 47 and a pair of oppositely inclined vertically disposed working faces 48, 49. The notch 47 opens at the top, bottom and one side of the outer periphery of body 44. The inner ends of the working faces merge into each other and are disposed on the transverse median of said body 44 at a point between the longitudinal median and the other side of body 44. The width of the major portion of the notch 47 is greater than the width of member 29. The lower face of body 44 is provided with a transverse groove 50 of greater width than the portion of greatest width of notch 47. The groove 50 provides for the seating of body 44 on member 29 in the groove 37. The latter, notch 47 and groove 50 provide clearances for the member 29 and plunger 30 relative to each other on their shifting. The body 44 is formed lengthwise and concentrically thereof with a circular socket 51 which opens at the end 45 thereof. The body 44 is also formed with a diametrically extending passage 52 which opens into socket 51 and at the said other side of the periphery of body 44. The working faces 48, 49, when the plunger 30 is slid inwardly and outwardly respectively, act on the roller 41 to shift the latching member 39 to released position against the action of controlling spring 32.

The locking element 31 is of any well known type of cylinder lock which is secured in and slightly extended from the outer end of socket 51. The locking bolt of element 31 is mounted in passage 52 and when actuated to locking position, extends into a socket 53 formed in bar 9 to prevent a sliding action being had on plunger 30 to release the member 29 from its latching position until the locking bolt of element 31 is shifted to unlocking position.

The controlling spring 32 is mounted on shank 43 between the vertical edge of rabbet 42 and the combined guide and tensioning means 33. The latter consists of an angle-shaped member formed of a vertical and a horizontal leg 54, 55 respectively. The leg 54 has a large square opening 56 through which extends the shank 43. The leg 54 is of greater length than and depends from the forward end of leg 55. The leg 54 is capable of being adjustable forwardly and rearwardly of the shank 43 for increasing and decreasing the tension of spring 32. The means 33 is held in its adjusted position by a detachable holdfast device 57 carried by leg 55 and selectively engaging in one of the openings of the set of spaced openings 58 formed in the hanger 34. The latter, at its forward end, has an upstanding flange 59 which is anchored against the inner edge of bar 9 by the holdfast means 60.

The form of the invention shown in Figure 3 is the same as that shown in Figures 1 and 2 with the exception that the shank 71 of the latching member 72 shown in Figure 3 is of greater length than the shank of the latching member 29. A holder 73 has the rear end of shank 71 arranged therein. The top edge of shank 71 contacts with the lower end of a fixed bearing member 74. The holder 73 and member 74 are anchored to door body 10. Otherwise than that as stated, the modified form will be the same as the form of the invention shown in Figures 1 and 2.

When assembling the structure, the elements 33 and 34 are secured together and with element 33 depending from element 34. The member 29, with the controlling spring 32 on the shank 43 thereof, is mounted in the passage 20 at the upper end of section 9ᵇ of bar 9. The plunger 30 is then mounted relative to the member 29 in a manner whereby the latter will extend into the groove of the plunger. When the plunger is mounted relative to member 29 it extends into the lower portion of the channel 15. The section 9ᵃ of bar 9 is then mounted on the top of section 9ᵇ in a manner to have the plunger 30 arranged in the upper portion of channel 15. The sections 9ᵃ, 9ᵇ of bar 9 are then secured together and the element 33 is then positioned on the rear of shank 43 against spring 32. The element 34 is then secured to the section 9ᵃ of the bar 9.

When using the latch and lock structure for house doors, the latching member would be made of round stock instead of rectangular or square stock to enable the structure to be installed without making a mortise in the door.

What I claim is:

1. In a combined latch and locking structure, an upstanding supporting means formed with an upper channel of circular cross section opening at the front and back thereof, said supporting means being formed with a lower passage of rectangular cross section opening at the sides thereof and extending at right angles to said channel, said channel having the central part of its lower portion intersecting transversely the central part of the upper portion of said passage, a spring controlled latching member of rectangular cross section slidably mounted in said passage and normally extending from the outer end of the latter to latching position, said member intermediate its ends being formed transversely of its top with a groove having a vertically disposed rear side wall inclining from its vertical median rearwardly in opposite directions, said rear wall, at its center, being undercut to provide a recess, a roller mounted in and extended forwardly from said recess, a releasable plunger of circular cross section slidably mounted in said channel and having its lower portion formed with a transverse groove and the central rear part of its upper portion with a V-shaped cutout opening into said groove, said plunger disposed transversely of said member, said member extending into the groove of said plunger, and a wall portion of said cutout slidably engaging with said roller, when the plunger is slid, to move said member from latched to released position.

2. In a combined latch and locking structure, an upstanding supporting means formed with an upper channel opening at the front and back thereof, said means being formed with a lower passage opening at the sides thereof and extending at right angles to said channel, said channel having the central part of its lower portion intersecting transversely the central part of the upper portion of said passage, a spring controlled latching member slidably mounted in said passage, slidably connected to said supporting means and for normally extending from the outer end of said passage to latching position, said element being provided in its top with a transverse groove having a vertically disposed rear side wall inclining from its vertical median rearwardly in opposite directions, said rear wall, at its center, being undercut below its top to provide a recess, a roller mounted at and extending forwardly from said recess, a releasable plunger slidably mounted in said channel and having its lower portion formed with a transverse groove for the passage of said latching member, said plunger having the central part of the rear of its upper portion formed with a V-shaped cutout opening into the groove of said plunger, the wall portions of said cutout being arranged relative to said roller whereby one of said wall portions will ride against said roller when the plunger is shifted in one direction and move said member to released position.

HICKSON F. LITTLEDALE.